J. R. PICKUP AND F. SEELEY.
FENDER BRACE STRUCTURE.
APPLICATION FILED OCT. 17, 1921.
1,409,401. Patented Mar. 14, 1922.
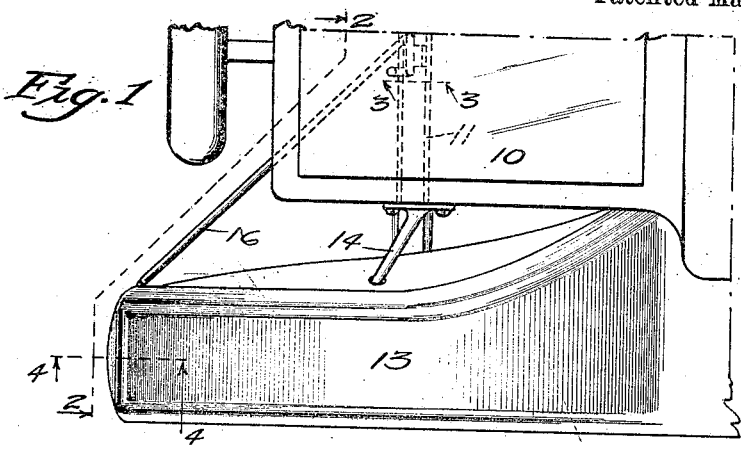
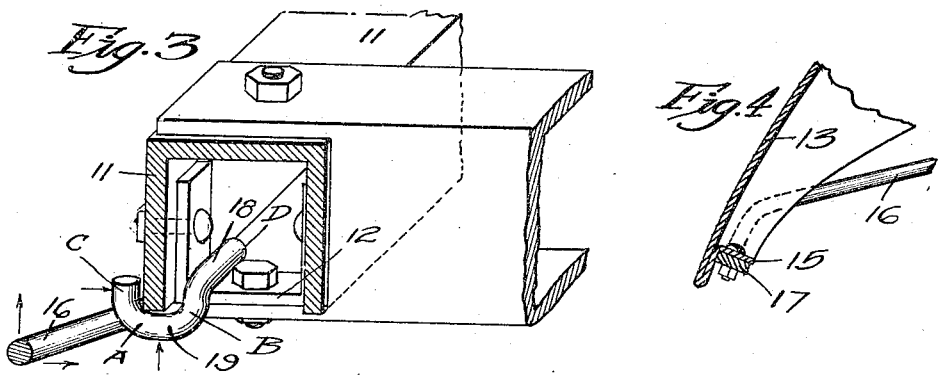
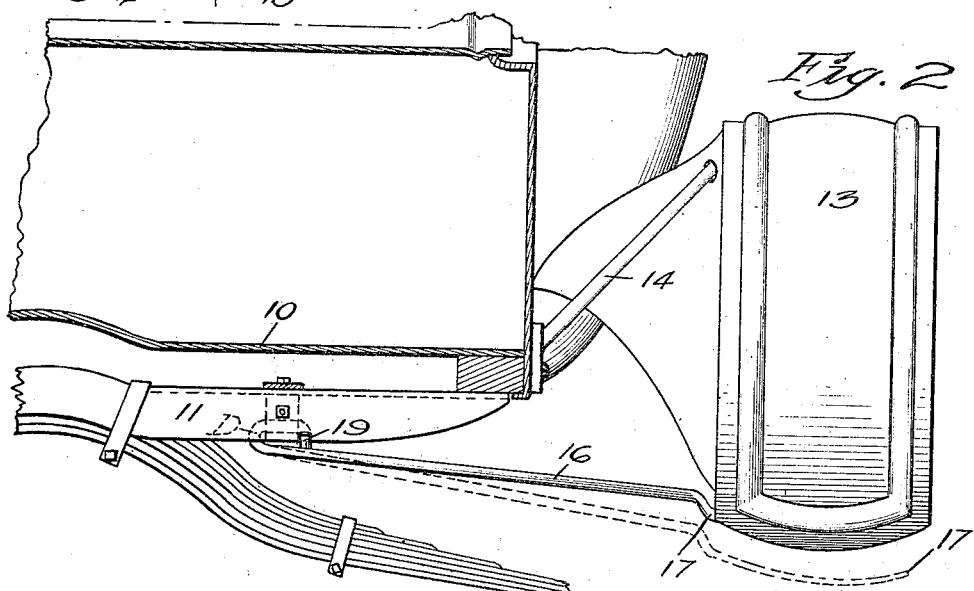
Witness
Lynn Latta
Inventors
John R. Pickup
Fred Seeley
By Bair & Freeman Attys

UNITED STATES PATENT OFFICE.

JOHN R. PICKUP AND FRED SEELEY, OF MURRAY, IOWA.

FENDER-BRACE STRUCTURE.

1,409,401. Specification of Letters Patent. Patented Mar. 14, 1922.

Application filed October 17, 1921. Serial No. 508,118.

*To all whom it may concern:*

Be it known that we, JOHN R. PICKUP and FRED SEELEY, citizens of the United States, and residents of Murray, in the county of Clarke and State of Iowa, have invented a certain new and useful Fender-Brace Structure, of which the following is a specification.

The object of our invention is to provide a fender brace structure of very simple, inexpensive and yet strong and efficient construction.

More particularly it is our object to provide such a brace adapted to be conveniently and easily mounted on certain types of cars for properly bracing the fender.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1 shows a top or plan view of a portion of an automobile equipped with a fender brace embodying our invention.

Figure 2 is a vertical, sectional view taken on the line 2—2 of Figure 1.

Figure 3 is a detail, perspective and sectional view taken on the line 3—3 of Figure 1; and Figure 4 is a sectional view taken on the line 4—4 of Figure 1.

Our fender brace is intended for use on a certain type of motor vehicles, having the body indicated in the accompanying drawings, by the reference character 10, and provided with a rear, transverse, downwardly, opening channel-shaped frame member 11.

The frame member 11 is made with an upwardly opening U-shaped brace 12 on the inside, as illustrated in Figure 3, and by dotted lines in Figures 1 and 2.

Spaced from the body 10 is a fender 13, which may be connected with the body by the ordinary brace 14 and any other desirable support.

The fender may have at its rear under portion a transverse reinforcing and brace member 15, as shown in section in Figure 4.

Our improved brace is of peculiar form and consists of a rod or the like 16, having at one end the slightly offset, flat, fixed, curved portion 17, shown for instance in Figure 4 and by dotted lines in Figure 2, adapted to fit snugly against the reinforcing member 15.

At the opposite end of the rod 16 is an engaging member, comprising a portion 18 bent over, as shown in Figures 2 and 3, and which when the brace is assembled on the automobile is slightly spaced above the body of the rod 16 and inclined divergingly therefrom.

The portion 18 terminates in an upwardly, opening U-shaped engaging member or portion 19, projecting substantially toward the body of the rod 16, as illustrated in Figures 2 and 3.

The U-shaped portion 19 consists of the bottom portion A and the substantially parallel arms B and C. (See Figure 3).

In the installation and practical use of our improved fender brace, the brace is manipulated until the portion 18 rests just above the lower part of the brace 12 next to the rear wall of the channel-shaped frame member 11, as shown in Figure 3.

It will be understood that at one end, the portion 18 has the downwardly projecting member B and at the other end, a corresponding downwardly projecting portion indicated at D in Figure 3. The portions B and D stand on opposite sides of the brace member 12.

The upwardly opening U-shaped member 19 receives the lower edge of the rear wall of the channel shaped member 11.

The parts are so arranged that when the brace is assembled on the member 11 and the member 12, the portion 17 stands just rearwardly and preferably slightly below the member 15, so that the brace rod 16 has to be sprung slightly to bring the member 17 to its proper position to be bolted to the member 15.

The member 17 is fastened to the member 15 by means of bolts 20 or the like and only one or two of such bolts are necessary to complete the mounting of the brace on the automobile.

It will be seen that the brace is then locked on the frame member 11 and brace 12 against twisting or shifting movement in any direction by the coaction of its parts with the parts of such frame and brace members.

The portions B and D prevent any lateral movement of the fender brace, while the member 16 and the member 19 engaging the lower edge of the rear wall of the channel-shaped frame member 11 prevent any upward movement of the brace.

Swinging movement of the brace horizontally is prevented by the engagement of the members B and C against the rear wall of the channel-shaped member 11. The bolts, which secure the portion 17 of the fender brace to the fender 13, of course, prevent any downward swinging movement of the brace rod 16.

It is thus obvious that the brace is firmly held in position and tends to hold the fender rigidly in position.

It will be observed that our improved brace can be put on the automobile with a minimum amount of work and by means of one or two bolts, as the only fastening devices.

It will, of course, be understood that the braces are made in rights and lefts so as to properly fit both sides of the car.

We desire to cover by our claims, the braces of the kind herein mentioned made of any suitable material for the purpose, and in any shape, which retains the spirit of our present invention.

We claim as our invention:

1. The combination of a channel-shaped frame member having a cross brace therein with a fender brace comprising a rod member, a member at one end thereof adapted to be secured to a fender, a portion at the other end of said rod bent to receive and engage said cross brace and the edge of one wall of said frame member.

2. A fender brace comprising a rod member, an engaging member at one end thereof slightly offset and being curved and having a flat face, an upwardly extending portion at the other end of said rod, a horizontal portion projecting from said upwardly extending portion and diverging from the body of said rod and terminating in an upwardly opening U-shaped portion projecting toward the body of said brace, combined with a frame member and a brace supported thereon, said frame member having a portion in the shape of a downwardly opening channel, and an upwardly opening U-shaped brace member received therein.

Des Moines, Iowa, October 11, 1921.
JOHN R. PICKUP.
FRED SEELEY.